Dec. 31, 1963   R. J. HLAVACEK ETAL   3,115,670
METHOD FOR RESTRAINING ANIMALS
Original Filed Aug. 12, 1959                    3 Sheets-Sheet 1

Inventors
ROBERT JOHN HLAVACEK
JOHN E. SAUVAGE
JOHN WILLIAM DILLEHAY

By R. S. Story
Attorney

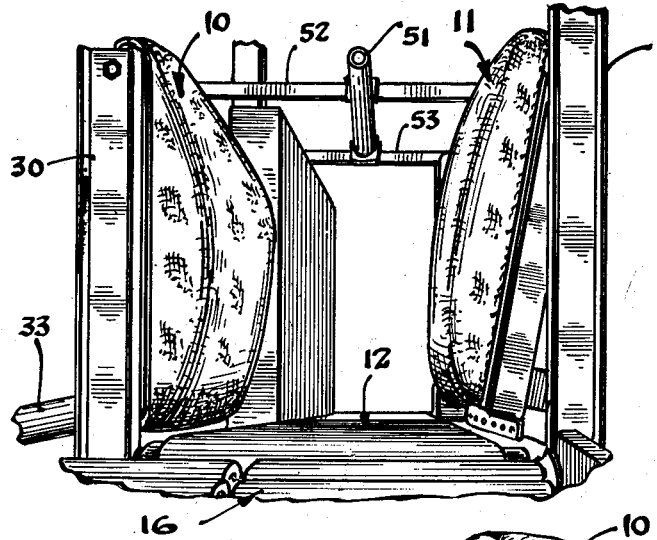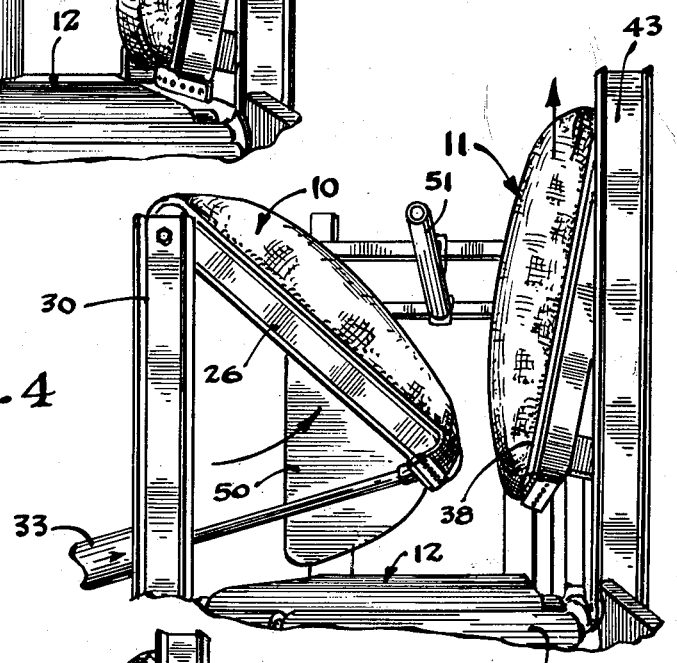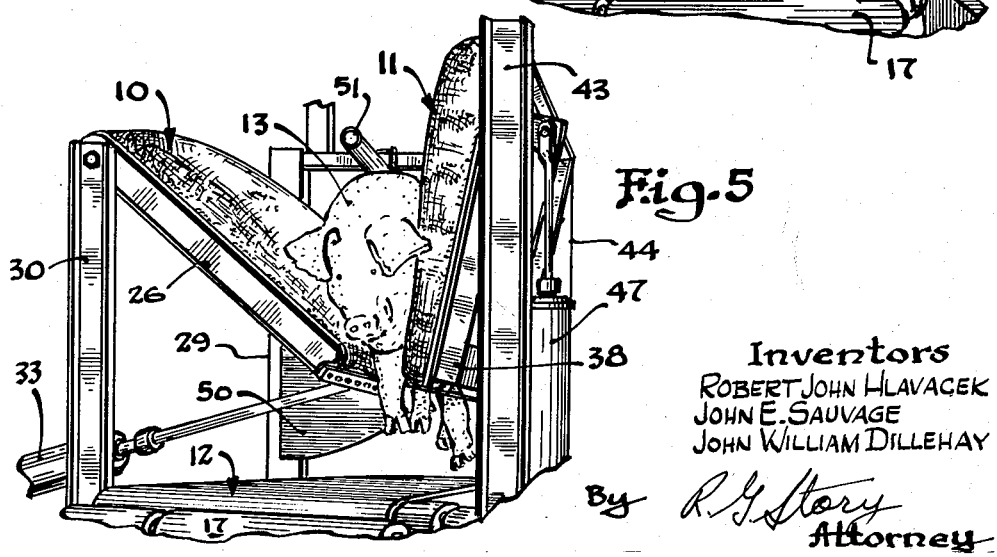

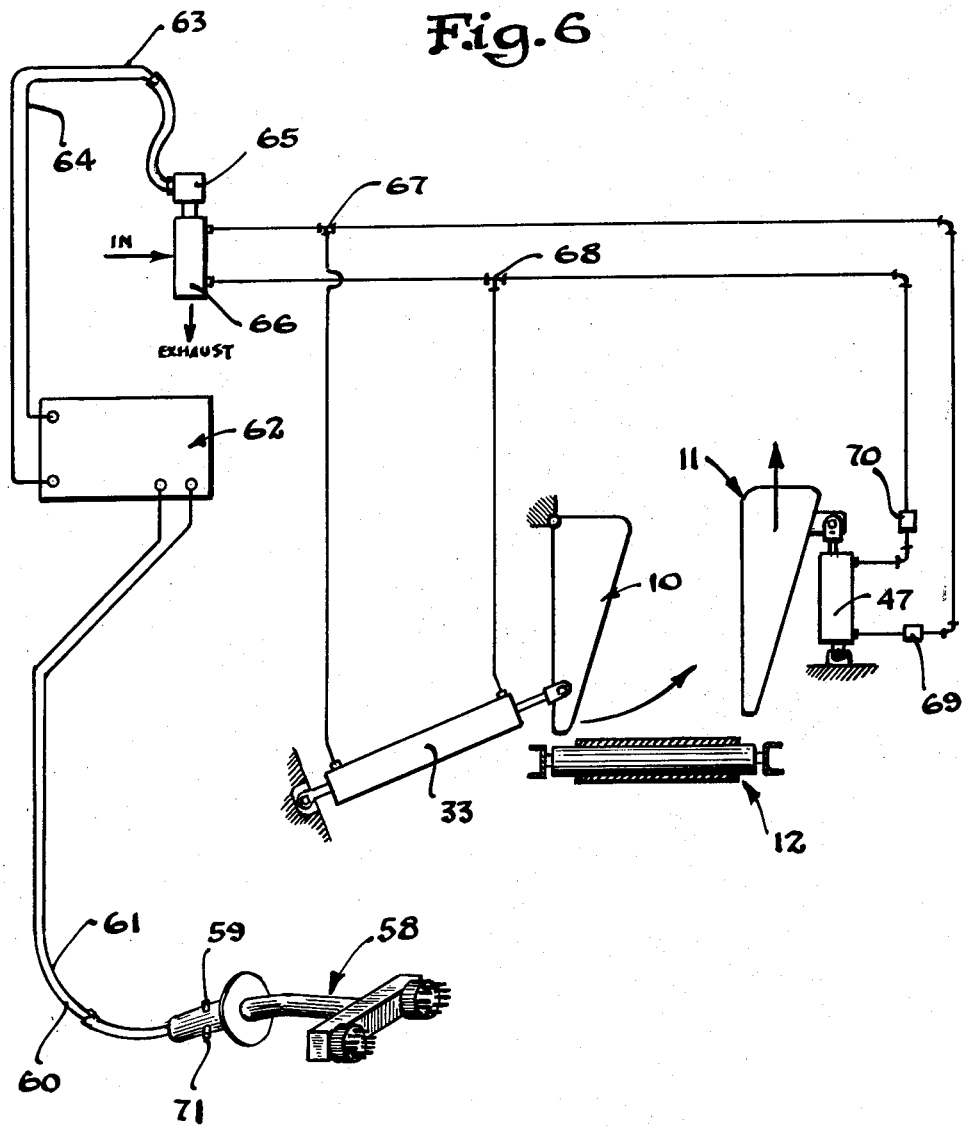

United States Patent Office 3,115,670
Patented Dec. 31, 1963

3,115,670
METHOD FOR RESTRAINING ANIMALS
Robert John Hlavacek, Clarendon Hills, John E. Sauvage, Chicago, and John William Dillehay, Downers Grove, Ill., assignors to Swift & Company, Chicago, Ill., a corporation of Illinois
Original application Aug. 12, 1959, Ser. No. 833,289, now Patent No. 3,051,984, dated Aug. 28, 1962. Divided and this application May 22, 1961, Ser. No. 111,576
4 Claims. (Cl. 17—45)

This invention deals generally with restraining animals. More specifically, this invention involves an improved method for restraining an animal from movement while it is being stunned in a slaughtering operation.

This application is a division of our prior copending application S.N. 833,289 filed August 12, 1959, relating to Method and Apparatus for Restraining Animals now Patent No. 3,051,984.

In the past where animals were to be stunned they have been caused to move singly into relatively small pens in which they were closely confined. These pens have been designed to accommodate all sizes of a given species, such as hogs, lambs, calves, and cattle. Usually even the larger animals could move either longitudinally or laterally within the pen and were free to rear upwardly on their hind legs. Obviously the smaller animals of a given species have been relatively free to move about within such pens. Where the animals can thus move about, it has been extremely difficult to efficiently stun them by mechanical or electrical means. For instance, it has been usual to stun animals by striking them on the head. Clearly, where the animals can move about they will attempt to dodge a blow, with the result that the animal may be injured and pained unnecessarily, and the operation becomes lengthy and inefficient.

More recently interest has turned to means for physically restraining the animals from movement during the stunning operation. We are aware of apparatus wherein two sides are moved inwardly against the body of the animal to prevent its movement. In these cases movement of the two sides is symmetrical, that is the motion of each side is equal to the motion of the other side and directed symmetrically with reference to a vertical line. However, it has been found that the prior apparatus has excessively squeezed the thoracic cavity of the animal. In some instances it is believed that the pressure has been of such a degree as to contribute internal damage to the animal.

Therefore, it is a principal object of our invention to provide an improved method for mechanically restraining animals from movement.

Another object of our invention is to provide an improved method for restraining animals within a wide range of weights and sizes in a given species.

A further object of this invention is to provide an improved method for restraining animals within a relatively wide range of sizes without causing any substantial injury to said animals.

An additional object of this invention is to restrain animals by lifting with a minimum amount of squeeze.

It is still another object of this invention to provide an improved method for restraining animals wherein most of the weight of the animal is supported on one side.

It is a still further object of this invention to provide an improved method for restraining and stunning animals in an attitude whereby, when stunned, each animal will come to rest upon the same corresponding side with respect to preceding animals.

Further objects and advantages of this invention will become apparent from the drawings and following specification:

Generally, our method involves moving an animal into a restraining zone and then applying two distinct, non-symmetrical forces to the sides of said animal. One force is applied against the lower portion of one side of an animal, urging it in an inclined direction upwardly and inwardly toward the opposite side of said zone. After a slight delay, a second, nonsymmetrical force is applied to the opposite side of the animal in an upward direction, with the result that the animal is lifted upwardly and rolled or tilted upon the first side mentioned. Thus, the weight of the animal is supported mainly upon the one side and squeezing of the body of the animal is minimized. When held in this attitude the animal is helpless and is prevented from movement under its own power. Subsequently, the animal is rendered unconscious as by electrical or mechanical shock; and the forces are removed to gradually lower the animal to rest upon the first mentioned side. The animal is then moved longitudinally forwardly from said restraining zone; and the vascular system of the animal is severed as soon as possible after leaving the zone.

One embodiment of an apparatus devised for carrying out this method is shown in the drawings. Basically, it includes a pair of animal engaging means comprising two movable cushions flanking an endless conveyor. The conveyor advances a standing animal to a point between the engaging means, where the two cushions are then actuated by an operator to restrain the animal. One cushion is disposed so that it may be moved on an inclined path inwardly and upwardly across the conveyor. The opposite cushion is confined to be movable only vertically. The cushions are operated so that shortly after the first cushion begins to move inwardly and upwardly toward the second, the latter begins moving upwardly. This action will engage an animal and lift its weight from the conveyor while the second cushion will roll or tilt the animal so that it rests on one side of the first cushion. When the animal is to be released the motion of each cushion is reversed and again the second cushion is delayed slightly so that the unconscious animal will be deposited with the side engaged by the first cushion resting on the conveyor surface. The conveyor then carries the animal from the apparatus.

It is to be expressly understood that the drawings are for purposes of illustration only and are not to be taken as a definition of the limits of the invention, reference being had to the appended claims for this purpose. In said drawings:

FIGURE 3 is a partial perspective view of the apparatus taken from the forward end when the cushions are in the open position;

FIGURE 4 is a perspective view of the apparatus similar to FIGURE 3 showing the cushions in the closed position;

FIGURE 5 is a partial perspective view of the apparatus taken from the forward end showing an animal restrained therein; and FIGURE 6 is a diagrammatic illustration of the control system for the apparatus.

Our method involves urging each animal forward under its own locomotion to the entrance of a restraining zone wherein it is intended to stun the animal. The animal may then proceed forwardly under its own power or be carried forward by a conveying means. When the animal is within the restraining zone, it is engaged mechanically on two sides while the voluntary upward movement of the animal is limited. Preferably force is applied upwardly and inwardly at only one side of the animal while another nonsymmetrical force, limited to an upward direction, is applied to the opposite side of the animal. In this way excessive squeezing of the thoracic cavity of the animal is avoided since the greater portion of the animal's weight rests upon one side rather than the comparatively unprotected underside of the animal. These forces are applied against the animal so as to lift substantially all of its weight from its feet. With smaller animals this may result in the animal being lifted completely from the conveyor, while in larger animals the feet will continue to rest thereon.

While the animal is thus restrained, an electric current is applied to the head of the animal for approximately one to four seconds and at a sufficient voltage to render the animal unconscious. At the time the electric current is withdrawn the forces supporting the animal are withdrawn, allowing the animal to fall to the conveyor in an attitude whereby it rests upon the same side which supported its weight during restraint. Thus each successive animal will fall upon the conveyor in the same attitude with the underside of the neck of each animal exposed to one side of the conveyor. The conveyor immediately moves the animal longitudinally from the restraining zone where it is immediately stuck, preferably in the neck area. Immediately as the animal is removed from the restraining zone, a succeeding animal is advanced therein.

Figure 1:
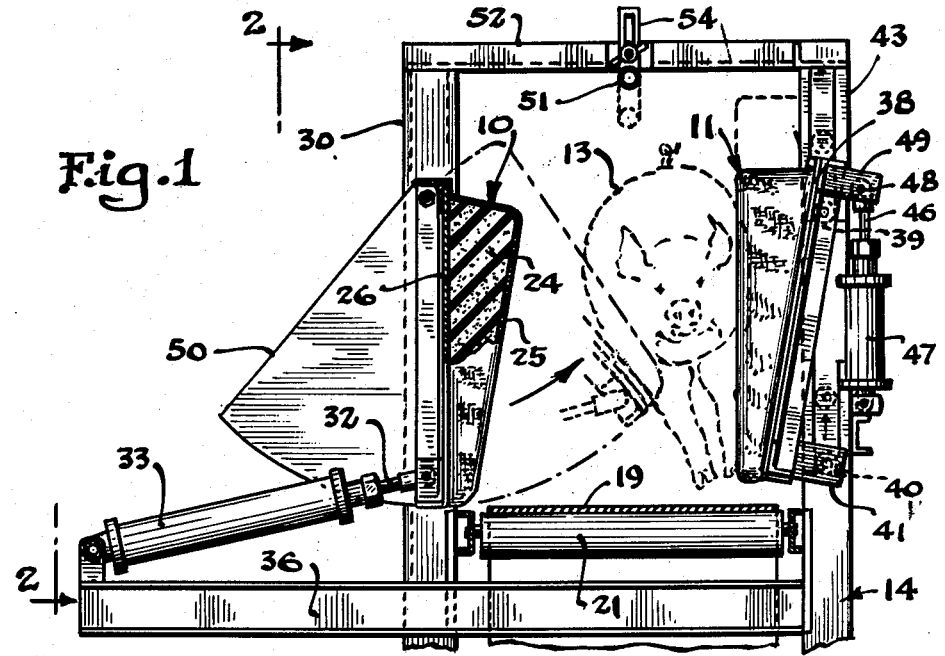
FIGURE 1 is an end view of the apparatus, with parts broken away, showing the limits of movement of the two cushions.
Figure 2:
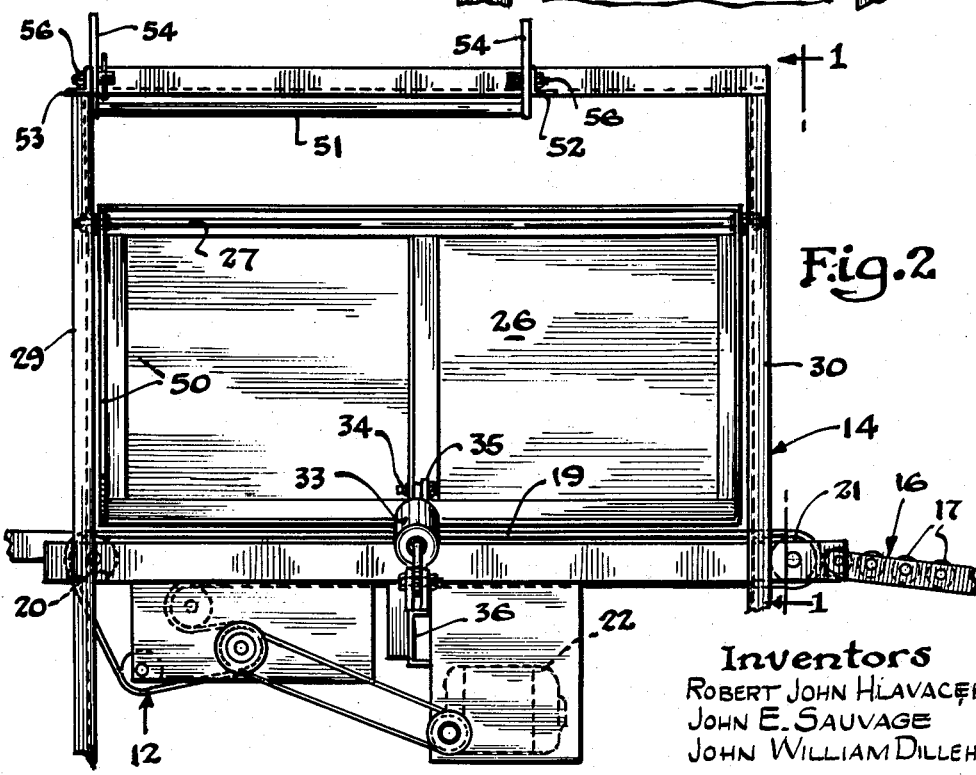
FIGURE 2 is a side view of the apparatus shown in FIGURE 1.

Referring to the figures, an apparatus for carrying out this method may be seen. As illustrated in FIGURE 1, the apparatus comprises basically a pair of movable cushions generally indicated at 10, 11, and an endless conveyor generally indicated at 12. An animal restrained therein is generally indicated by 13. The cushions generally 10, 11, and conveyor generally 12 are supported within a frame generally 14. A runway (not shown) along which the animals pass in single file connects with the restraining apparatus at the left side as seen in FIGURE 2. At the right side of the restrainer a discharge conveyor generally 16 comprising a plurality of independent rollers 17 is provided. Still referring to FIGURE 2, it may be seen that the conveyor 12 comprises an endless belt 19 passing across two drums 20, 21 journaled to the frame at the entrance and discharge end of the restrainer, respectively, and driven by an electric motor 22 located beneath the frame 14. The endless conveyor 14 extends slightly beyond the discharge end of the restrainer so as to insure that the unconscious animal will be cleared from between cushions 10 and 11. The rollers 17 of discharge conveyor 16 are arranged on an incline downwardly from the conveyor 12 so that the animal will move thereon due to its own weight.

Each cushion 10, 11 comprises a mattress of foam rubber 24 covered by a sheet 25 of a substantially impervious material, such as plastic or, preferably, a roughened surface rubber belting material, and secured to a plate 26 of wood, metal, or other rigid material. One cushion (cushion 10 in the drawings) is pivotally mounted by means of a shaft 27 supporting plate 26 and journaled between a pair of upright frame members 29, 30. A piston rod 32 extending from a pneumatic cylinder 33 is pivotally connected by a pin 34 to a bracket 35 at the lower edge of plate 26 of cushion 10. The pneumatic cylinder 33 is moored to a horizontal crosspiece 36 of frame 14.

At the opposite side of the restraining apparatus cushion 11 is similarly secured to a plate 38. Plate 38 has upper and lower casters 39, 40, respectively, secured to each end thereof. As may be seen in FIGURE 1, casters 40 are mounted on a short leg 41 extending perpendicular to the plate 38, while casters 39 are rotatably secured to the plate itself. This arrangement enables the tapered cushion 11 to be positioned so that its major surface is substantially vertical. The casters 39, 40 are in turn located in vertical tracks formed by upright frame members 43, 44. A piston rod 46 extending from pneumatic cylinder 47 is pivotally connected by means of a pin 48 to bracket 49 secured to plate 38 centrally of the cushion 11 and along the upper edge thereof. The pneumatic cylinder 47 may be secured to frame 14 in any convenient manner.

It will be apparent from the drawings that plates 26, 38 may be reinforced by rib members. Where desirable, shaft 27 associated with plate 26 and casters 39 associated with plate 38 may be rotatably secured to the rib members rather than the plates themselves. Also, a wing gate 50 is secured to the rear end of plate 26 (left end in FIGURE 2) to prevent animals from entering or moving under the apparatus when in the closed position.

An adjustable overhead rail 51 is suspended beneath support members 52, 53 by means of slotted straps 54. The vertical position of rail 51 may be raised or lowered by loosening castle-head nuts 56, sliding the slot in each strap 54 along the supporting bolt (not shown), and then retightening nuts 56. Where a number of a given size of animal are to be processed, rail 51 is adjusted at a position a few inches higher than the animals allowing them to proceed freely into the restraining apparatus but preventing them from jumping over the cushions 10, 11 as the latter are moved into engagement with the animals.

The control system for the restraining apparatus is shown in FIGURE 6. It has been found convenient to operate the cushions 10 and 11 from a switch on the stunning instrument. This is particularly adaptable where stunning is accomplished electrically by an instrument such as that generally indicated at 58. (The details of such a stunning instrument form no part of this invention and are covered in another copending application for United States Letters Patent.) An electric control switch 59 located on the hand grip of the stunning instrument 58 may be used to initiate operation of the restraining device. This is accomplished by wires 60, 61 running to an electrical timing mechanism generally indicated at 62. The mechanism 62 relays the signal from the stunning instrument 58 through an additional pair of wires 63, 64 to a solenoid 65 operatively connected to an air valve 66. The air valve in turn is connected to a source of air under pressure (not shown) and to the atmosphere. An air line 67 runs from the valve 66 to the rear ends of pneumatic cylinders 33, 47. A second air line 68 connects the air valve with the forward (piston rod) ends of pneumatic cylinders 33, 47. A pair of constrictor means, such as orifices 69, 70 are placed in air lines 67, 68 near the rear and forward ends of pneumatic cylinder 47 respectively. The effect of orifices 69, 70 is to reduce the rate of air flow to and from the cylinder 47. As a result, the piston rod 46 and cushion 11 will be moved relatively slowly and delayed to the operation of cylinder 33 (and cushion 10) which receives and exhausts air at a greater rate.

Thus, when button 59 is momentarily depressed, an electric signal to timing mechanism 62 commences a timing sequence and energizes solenoid 65 to cause valve 66 to direct air under pressure into line 67 and thence to the rear ends of cylinders 33, 47. At this time, cushion 10 will pivot inwardly and upwardly and then cushion 11 will be moved upwardly after a slight delay and at a slower rate. Valve 66 will maintain pressure in line 67 until the timing mechanism completes the timing sequence and solenoid 65 is deenergized. At this time valve 66 will connect line 67 with the exhaust and line 68 will be connected with air under pressure, thus reversing the movement of cushions 10 and 11.

Obviously, other electrical control systems for directing air under pressure into lines 67 and 68 may also be employed. For instance, solenoid 65 could be energized by switch 59 and deenergized by a second switch 71, providing for manual rather than timed release of cushions 10 and 11.

The foregoing description is for the purpose of complying with 35 USC 112, and we do not desire to be limited to the exact details shown and described, for obvious modifications will be apparent to those skilled in the art to which this most nearly appertains, and such modifications may be made without departing from the spirit of the invention. For instance, the apparatus has been illustrated for use in restraining hogs. For this purpose it has been found that the cushions should be approximately four feet long while the conveyor 12 should have a run of approximately four and one half feet. However, it is obvious that the apparatus and method may be adapted for use with other animals, such as sheep, calves, and cattle upon minor modifications in dimension and strength of materials used.

We claim:

1. The method of restraining an animal from movement, said method comprising the steps of advancing an animal in a given direction toward a selected area; engaging and urging the animal from one side in an inclined direction upwardly toward the opposite side upon reaching said area; and engaging the opposite side of said animal and lifting vertically whereby the animal is raised and rolled onto said one side.

2. In a method for restraining and stunning animals, the steps comprising advancing each animal in a given direction toward a selected area; lifting each animal as it reaches said area by the application of nonsymmetrical forces to the sides of the animal whereby the animal is rolled to rest principally upon one side; stunning the animal while resting on said one side; and lowering the stunned animal to rest upon said one side.

3. In a method for restraining and stunning animals, the steps comprising advancing each animal in a given direction toward a selected area; lifting each animal as it reaches said area by the application of nonsymmetrical forces against opposite sides of the animal, whereby the animal is lifted and rolled to rest principally upon one side; stunning the animal while resting on said one side; lowering the stunned animal to rest upon said one side; and removing said animal in said given direction from said selected area.

4. In a method for restraining and stunning animals, the steps comprising advancing each animal in a given direction toward a selected area; applying a force inclined upwardly against one side of said animal; applying a second force vertically against the opposite side of said animal, whereby the animal is lifted and rolled upon said one side; stunning the animal while resting upon said one side; lowering the stunned animal to rest upon said one side; and removing said animal in said given direction from said selected area.

References Cited in the file of this patent

UNITED STATES PATENTS

| | | |
|---|---|---|
| 2,764,129 | Haggard | Sept. 25, 1956 |
| 2,912,715 | Moss | Nov. 17, 1959 |

FOREIGN PATENTS

| | | |
|---|---|---|
| 676,097 | Great Britain | July 23, 1952 |